United States Patent
Reeves (10) Patent No.: US 7,028,154 B2
(45) Date of Patent: Apr. 11, 2006

(54) PROCEDURE TO REDUCE COPY TIME FOR DATA BACKUP FROM SHORT-TERM TO LONG-TERM MEMORY

(75) Inventor: Jay D. Reeves, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 334 days.

(21) Appl. No.: 10/175,179

(22) Filed: Jun. 18, 2002

(65) Prior Publication Data

US 2003/0233525 A1    Dec. 18, 2003

(51) Int. Cl.
G06F 12/02    (2006.01)

(52) U.S. Cl. ................ 711/162; 711/161; 711/217; 711/218

(58) Field of Classification Search ............ 711/114, 711/161, 162; 710/38; 714/6; 707/204
See application file for complete search history.

(56) References Cited

U.S. PATENT DOCUMENTS

| | | | |
|---|---|---|---|
| 5,321,826 A | 6/1994 | Ushiro | |
| 5,586,291 A | 12/1996 | Lasker et al. | |
| 5,617,530 A | 4/1997 | Stallmo et al. | |
| 5,835,955 A * | 11/1998 | Dornier et al. | 711/162 |
| 6,175,903 B1 | 1/2001 | Joo | |
| 6,243,795 B1 | 6/2001 | Yang et al. | |
| 6,304,980 B1 * | 10/2001 | Beardsley et al. | 714/6 |
| 6,338,126 B1 * | 1/2002 | Ohran et al. | 711/162 |
| 6,389,459 B1 * | 5/2002 | McDowell | 709/216 |
| 6,487,561 B1 * | 11/2002 | Ofek et al. | 707/204 |
| 6,606,683 B1 * | 8/2003 | Mori | 711/114 |
| 6,609,183 B1 * | 8/2003 | Ohran | 711/161 |
| 6,629,248 B1 * | 9/2003 | Stachura et al. | 713/340 |
| 6,636,984 B1 * | 10/2003 | McBrearty et al. | 714/6 |
| 6,757,753 B1 * | 6/2004 | DeKoning et al. | 710/38 |
| 6,772,303 B1 * | 8/2004 | Crockett et al. | 711/162 |
| 6,820,180 B1 * | 11/2004 | McBrearty et al. | 711/162 |
| 6,839,819 B1 * | 1/2005 | Martin | 711/162 |
| 2002/0103980 A1 | 8/2002 | Crockett et al. | |

* cited by examiner

Primary Examiner—T Nguyen (57) ABSTRACT

Systems and methods for backup of data in redundant data storage systems. In this regard, one embodiment can be broadly summarized by a representative system that copies a block of data from a primary storage unit to a primary backup storage unit using a primary addressing sequence that begins with a first start address; and substantially concurrently copies a second block of data from a secondary storage unit to a secondary backup storage unit using a secondary addressing sequence that begins with a second start address.

Another embodiment can be described as a method wherein the first start address is the same as the second finish address; the primary addressing sequence uses an incrementing count, and the secondary addressing sequence uses a decrementing count. Other systems and methods are also provided.

20 Claims, 6 Drawing Sheets

PROCEDURE TO REDUCE COPY TIME FOR DATA BACKUP FROM SHORT-TERM TO LONG-TERM MEMORY

FIELD OF THE INVENTION

The present invention generally relates to the field of redundant data storage systems, and in particular to preventing data loss in disk storage subsystems.

DESCRIPTION OF THE RELATED ART

External memory storage systems often combine multiple inexpensive disk drives into an integrated array, to obtain a cost-effective system whose performance, capacity, cost savings, and reliability exceeds that of a single large drive. An array of such drives appears to a host computer as a single logical drive. If the array is configured to operate in a non-redundant manner, the mean time between failures (MTBF) is relatively low, as it equals the MTBF of an individual drive divided by the number of drives in the array. To improve MTBF, an array of drives may be configured as a redundant array of inexpensive disks (RAID). A RAID array incorporates fault tolerance by using a redundant architecture that protects against data loss created by hardware failure.

The disk controller in a RAID system is termed a RAID controller. RAID controllers have been defined at different "levels" to provide different sets of features. User data in a RAID system is moved between different RAID levels by a data storage management system that may utilize a "data map" to keep track of data movement. This data map is updated periodically, and its preservation is critical for system operational integrity. If the data map is lost, then access to the user's data is also lost. In some systems this data map is stored in non-volatile RAM (NVRAM), which acts as a short-term memory storage mechanism that is powered from an on-board battery in the event the main system power fails.

The NVRAM also performs another important task. Data access latency for the host computer is reduced by the NVRAM operating as a "write cache" to temporarily store data before the data is transferred to the RAID memory disks. Once the data is written by the host computer into the NVRAM, the transaction is acknowledged and the host computer moves on to its next operation. At this point, as far as the host computer is concerned the data has been successfully transferred to a hard disk drive. Therefore for a period of time, data destined for RAID memory disk storage is stored only in the NVRAM. If main system power fails at this time, the on-board battery is used to keep the NVRAM data from being lost, while a data backup process is initiated to copy the contents of the NVRAM into a pre-defined form of long-term non-volatile storage that is generally referred to as a "dump disk." Once the data is copied to the dump disk, which may be, for example, a magnetic disk storage device, stored data is retained even if the power supply to the dump disk is subsequently disconnected.

The dump disk is generally not used as a "primary" mechanism for storing a data map because the read/write performance of this disk is much lower than that of the NVRAM.

Upon main system power failure, it is desirable that a dump disk remain powered-up at least long enough to allow the disk controller to copy the data map and write cache data, which are jointly referred to henceforth in this disclosure as "valid" data, from the NVRAM to one or more dump disks. One way to do this is to use an external battery backup system (in addition to the NVRAM batteries) that has the capability under main system power failure conditions to operate the dump disk until the NVRAM data is safely copied.

One of the biggest challenges with this architecture is to ensure that the external battery backup system has enough capacity to complete the backup, but is not too large as to unnecessarily increase cost, complexity, etc.

As disk arrays become larger, and system requirements increase, there is a corresponding demand for larger NVRAM size. The duration of time that data stored in the NVRAM is retained upon main system power failure, is directly related to battery capacity and NVRAM size. With finite improvements in battery technology and the limitations placed upon battery capacity due to cost factors and physical size constraints, the ongoing demand for larger NVRAM size leads to a situation where the duration of time that NVRAM data can be retained upon main system power failure, is being reduced. This leads to a serious problem during a data backup process from NVRAM to dump disk after a power failure.

To support a fault tolerant system, such as a high-availability RAID system, at least two separate RAID controllers are used, with one of the two controllers being designated to operate as a "master" controller. Each of the two RAID controllers has its own corresponding NVRAM, and dump disk, together with appropriate power sources. The NVRAMs in the two controllers generally contain identical data. Under a system power failure condition, the master controller carries out a data backup by copying the valid data contained in its NVRAM, into the two dump disks. The valid data is generally copied from NVRAM to each of the two dump disks in a sequential manner. For example, if the NVRAM contained 64 Kbytes of valid data, the copy sequence may begin at address 0000 and end at address FFFF (Hex).

In systems that contain much larger amounts of valid NVRAM data, it is likely that this copy operation, which needs to be replicated for the two dump disks, may take several minutes. During this time, there may be a catastrophic failure in the battery systems that power the dump disk or the charge in the battery system may not be sufficient to permit the entire contents of the NVRAM to be copied to the dump disks. If this happens, and the copying operation is not completed, the data remaining in the NVRAM may be lost subsequently, because this data can be retained only as long as the NVRAM battery can power the NVRAM. The NVRAM battery may last only a few hours or a few days depending on its capacity, and the size of the NVRAM.

It would therefore be desirable to provide a solution that minimizes the time required to copy data stored in short term non-volatile memories such as NVRAM, into longer-term non-volatile storage media, such as magnetic dump disk, during a main system power failure. Protecting valid data becomes especially important in redundant data storage systems, where fault tolerance is a critical parameter.

SUMMARY OF THE INVENTION

The present invention provides methods, systems and means for backup of data in redundant data storage systems. In this regard, one such data storage system can be broadly summarized by a representative system that copies a block of data from a primary storage unit to a primary backup storage unit using a primary addressing sequence that begins with a first start address; and substantially concurrently copies a second block of data from a secondary storage unit to a secondary backup storage unit using a secondary addressing sequence that begins with a second start address.

Another embodiment can be described as a method wherein the second start address is the same as a first finish address, the primary addressing sequence uses an incrementing count, and the secondary addressing sequence uses a decrementing count. It can be seen that this method creates a crossover point in time where the data transferred to the two backup storage units complement each other and jointly provide a complete image of the data that had been stored individually in the primary and the secondary storage units. At this crossover point the information has been protected in a joint manner in as little as half the time it would have taken in a conventional method that stores two identical redundant copies in two backup storage units.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present invention will now be described with particular reference to a system incorporating a disk array architecture, such as used in a redundant array of inexpensive disks (RAID) system. It should be apparent, however, to persons having ordinary skill in the art that the explanation can be extended to other applications that utilize a redundant architecture incorporating a combination of short-term as well as long-term memory storage of data.

Figure 1:
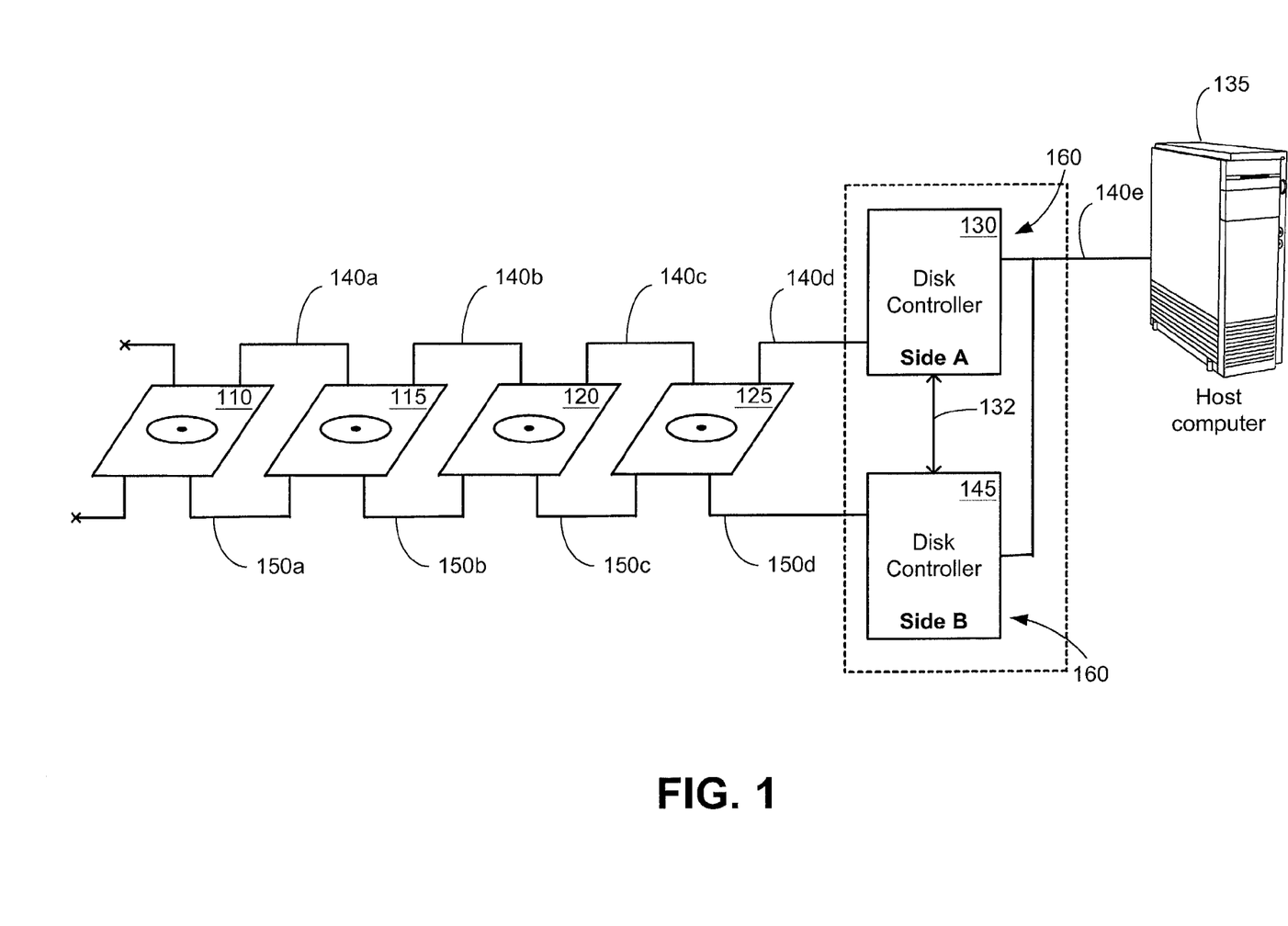
FIG. 1 is a schematic representation of an array of disks that is controlled by two disk controllers in a redundant disk controller system.

FIG. 1 is a schematic representation of an array of disks that is controlled by two disk controllers in a redundant disk controller system.

The host computer 135 may be a personal computer (PC), a microprocessor system, a network server, a mainframe computer, or a dedicated system controller unit. In this particular illustration, host computer 135 is shown connected via a bus interface 140e to a redundant disk controller system 160, which comprises of two disk controllers 130 and 145 that are located external to the host computer 135. Disk controller 145 is generally selected to be identical to disk controller 130, so that it may provide equivalent operating capabilities in case of failure of disk controller 130.

Bus interface 140e may utilize a variety of mechanisms, such as a small computer system interface (SCSI) or a high-speed Fibre-channel interface. It may also use an AT Attachment (ATA) interface that most desktop PCs use to access IDE (Integrated Drive Electronics) disks.

The disks 110, 115, 120, and 125 are configured as a redundant array of disks having a primary serial interconnection and a secondary serial interconnection. The primary serial interconnection, which is formed by bi-directional communication links 140a, 140b, 140c, and 140d is associated with disk controller 130. The secondary serial interconnection, which is formed by bi-directional communication links 150a, 150b, 150c, and 150d is associated with disk controller 145.

The redundant disk controller system 160 provides protection against failure of any one of the two disk controllers 130 and 145. For example, if disk controller 130 were to fail, host computer 135 may still access the array of disks using disk controller 145, and retrieve data stored in the array of disks.

For ease of explanation, the circuitry associated with disk controller 130 is labeled Side A, while the circuitry associated with disk controller 145 is labeled Side B. In a typical application, one of the two sides assumes control in a role that is referred to by various names, such as "master," "active," or "primary." The other side is consequently referred to by corresponding names such as "slave," "standby," or "secondary." This "master-slave" arbitration is used to avoid operational conflicts between two devices when they interact with common elements. As an example, such a situation may arise when both disk controllers 130 and 145 attempt to simultaneously transmit identical information back to the host computer 135, over the single bi-directional communication link 140e that is shared by both disk controllers. This type of problem may occur in response to a "read disk memory" request initiated by the host computer 135. Under this condition, only the designated "master" disk controller is permitted to transmit data back to the host computer 135. If the designated master disk controller were to fail, the slave disk controller takes over the role of master.

The bi-directional communication link 132 provides a mechanism to convey messages between the two redundant disk controllers 130 and 145. These messages may include information necessary to ensure that both disk controllers contain identical data. This process of ensuring identical data is termed "synchronization" or "sync," and is used to provide uninterrupted operation of the system, after a switchover has taken place from the master to the slave controller due to a failure in the master controller.

While the illustration of FIG. 1 indicates two distinct disk controllers, and two distinct serial interconnections in the disk array, it will be obvious to one of ordinary skill in the art, that the physical implementation of these configurations may comprise a single controller unit that incorporates both disk controllers inside (shown as the dashed box in FIG. 1). For example, the disk controllers 130 and 145 may be part of a dual-ported Fibre Channel drive with the two serial interconnections to the array of disks physically incorporated within a single cable structure. Where found more convenient, single port drive structures such as those used for ATA type drives may be utilized to provide two independent serial interconnections to the array of disks. The two disk controllers may also be physically integrated into the host computer 135 in certain systems.

It can also be appreciated that the redundant disk controller system shown in FIG. 1 may be referred to specifically as a RAID system, and the disk controllers 130 and 145 may be individually referred to as RAID controller 130, and RAID controller 145. Furthermore, if at any particular instance, RAID controller 130 was operating in the "master" mode it may be referred to as the "primary RAID controller" and the RAID controller 145 may be correspondingly referred to as the "Secondary RAID controller."

The terms "primary RAID controller" and "secondary RAID controller" may also be referred to broadly in connection with redundant storage systems in general, as a "primary controller" and a "secondary controller."

Figure 2:
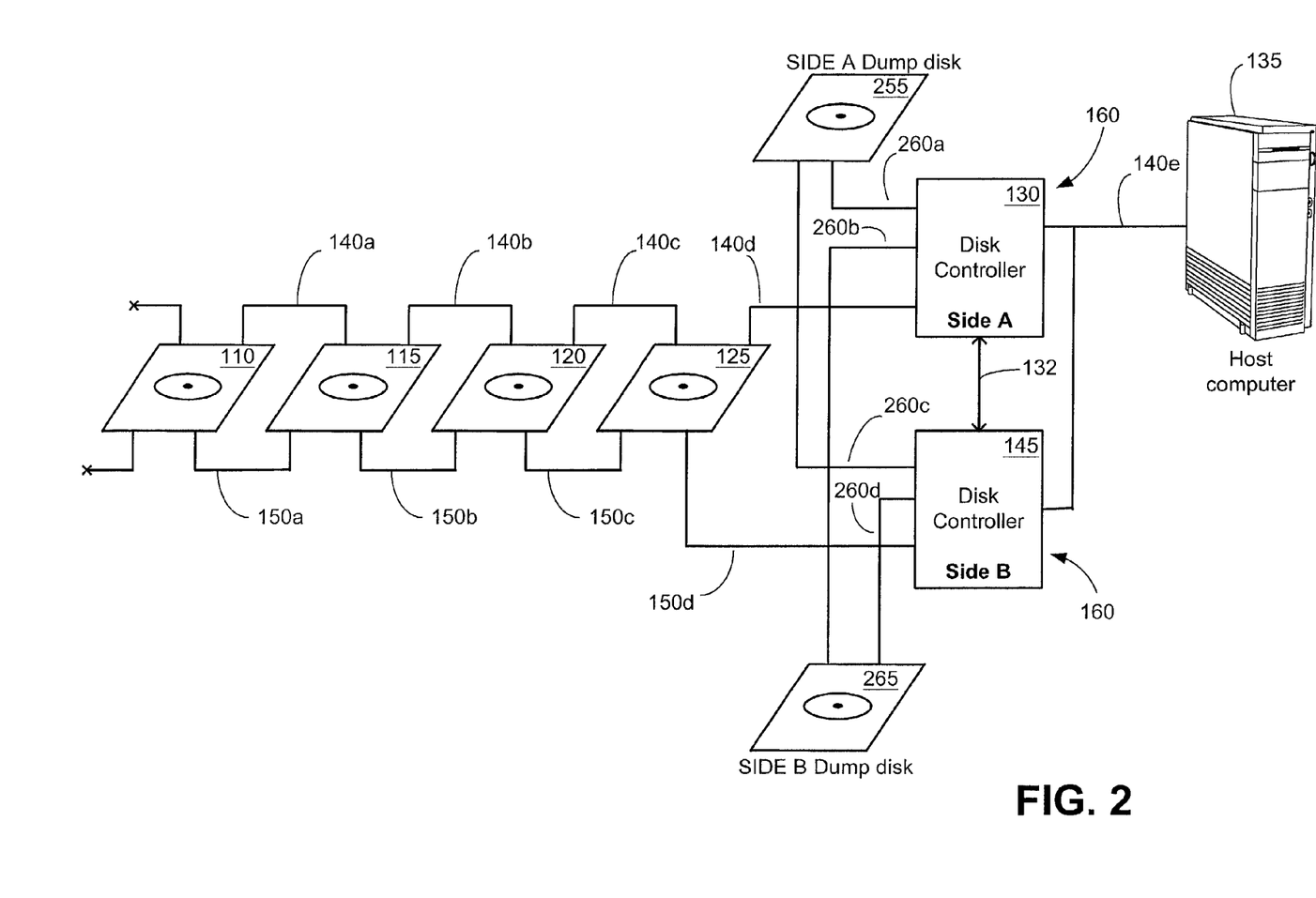
FIG. 2 is a schematic representation of FIG. 1 together with dump disks.

FIG. 2 is a schematic representation of FIG. 1 together with dump disks that are used for backing up data during main system power failure. The disk controller 130 is connected by communication link 260a to a non-volatile disk storage system that is defined as Side A dump disk 255, and by a communication link 260b to a non-volatile disk storage system that is defined as Side B dump disk 265. Disk controller 145 is connected by a communication link 260c to the Side A dump disk 255, and by a communication link 260d to the Side B dump disk 265. The communication links 260a and 260b allow disk controller 130 to read/write data to either dump disk 255 or to dump disk 265. Similarly, communication links 260c and 260d allow disk controller 145 to read/write data from either dump disk 255 or dump disk 265. Dump disk 265 is typically selected to be identical to dump disk 255.

While the dump disks 255 and 265 are shown in FIG. 2 to exist outside the disk controllers for example purposes, these dump disks may generally exist internally within the disk controllers as mentioned earlier in this disclosure. In certain other applications, dump disks 255 and 265 may also be incorporated as a part of the disk array comprised of disks 110, 115, 120, and 125.

The communication links 260a, 260b, 260c, and 260d are shown distinctly separate from one another in FIG. 2, for explanation purposes. But it can be appreciated, that the physical implementation of these communication links may take various forms, which in certain cases may utilize an integrated medium such as a single cable connection that may simultaneously carry multiple individual communication signals.

Figure 3:
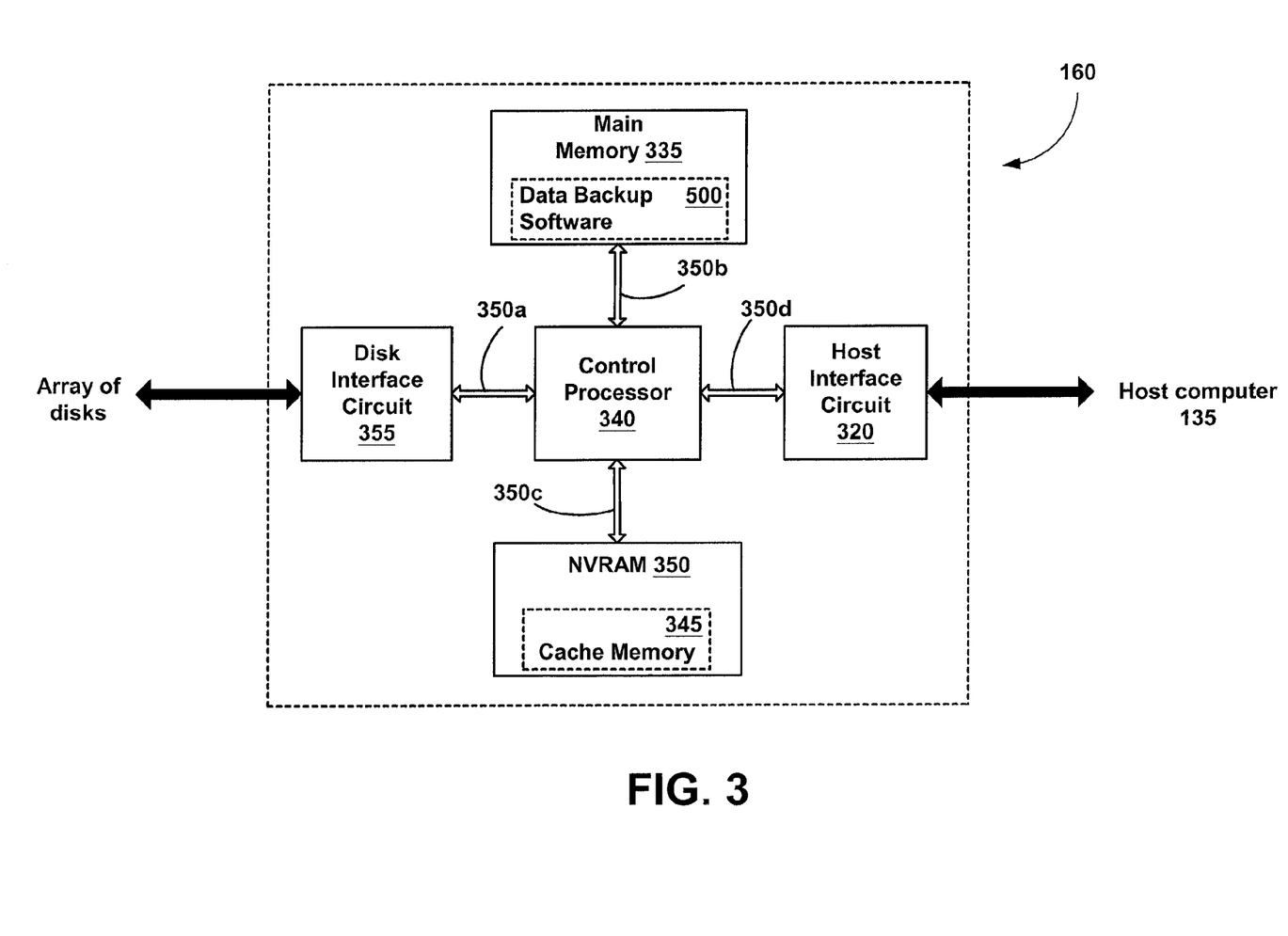
FIG. 3 is a schematic representation of the functional blocks in a disk controller system.

FIG. 3 is a schematic representation of the functional blocks in a disk controller system 160. Disk controller 160, may incorporate a control processor 340, such as a microprocessor that is coupled to the host interface circuit 320 and the disk interface circuit 355. The control processor 340 is also coupled to a short term memory such as NVRAM 350, and a main memory 335. Buses 350a, 350b, 350c, and 350d provide the connections for control processor 140 and may be physically distinct to one another or can take the form of a common bus. Those of ordinary skill in the art will recognize several types of bus architectures such as a star, a common bus, or a daisy-chain may be utilized for this purpose.

As described earlier with reference to FIG. 1, disk memories 110, 115, 120, and 125 may be configured as an array of disks. Such an array of disks may be connected to the disk controller 160 via disk interface circuit 355.

In FIG. 3, data transfers between the host computer 135 and the array of disks are routed by control processor 340, through the host interface circuit 320 to cache memory 345. Cache memory 345 may comprise a "write cache" and/or a "read cache." The write-cache is sometimes referred to as a "buffer cache." Though shown for example purposes to be contained in NVRAM 350, cache memory 345 may comprise of non-volatile and/or volatile memories, depending upon the system requirements for redundancy in case of main system power failure.

When the host computer 135 initiates a write operation, the data is first written to the cache memory 345 and then transferred via disk interface circuit 355, to the array of disks. Similarly when the host computer 135 requests for a data fetch, which constitutes a read operation from the array of disks, disk controller 160 first determines if the requested data is already stored in the cache memory 345. If the requested data is stored in cache 345, the disk controller 160 provides this "cached" data to the host computer 135, thereby avoiding the necessity of accessing the array of disks which is slower than the cache memory 345. If the requested data is not stored in cache memory 345, then the data is retrieved from the array of disks, stored in cache memory 345 and then provided to the host computer 135. With this technique, the disk controller 160 maintains in the cache memory 345 a copy of the data transferred between host computer 135 and the array of disks during a read or a write operation.

The main memory 335 of FIG. 3 may include several types of memory devices such as read only memories as well as random access memories that permit read as well as write operations. The read only memories may contain programming information in the form of software and/or firmware. An example of such information is shown in the data backup manager 500. The random access memories contained in main memory 335 may be used to store information associated with the application that is being run on host computer 135. An example of such information is a cache management table that is used to operate cache memory 345.

Figure 4:
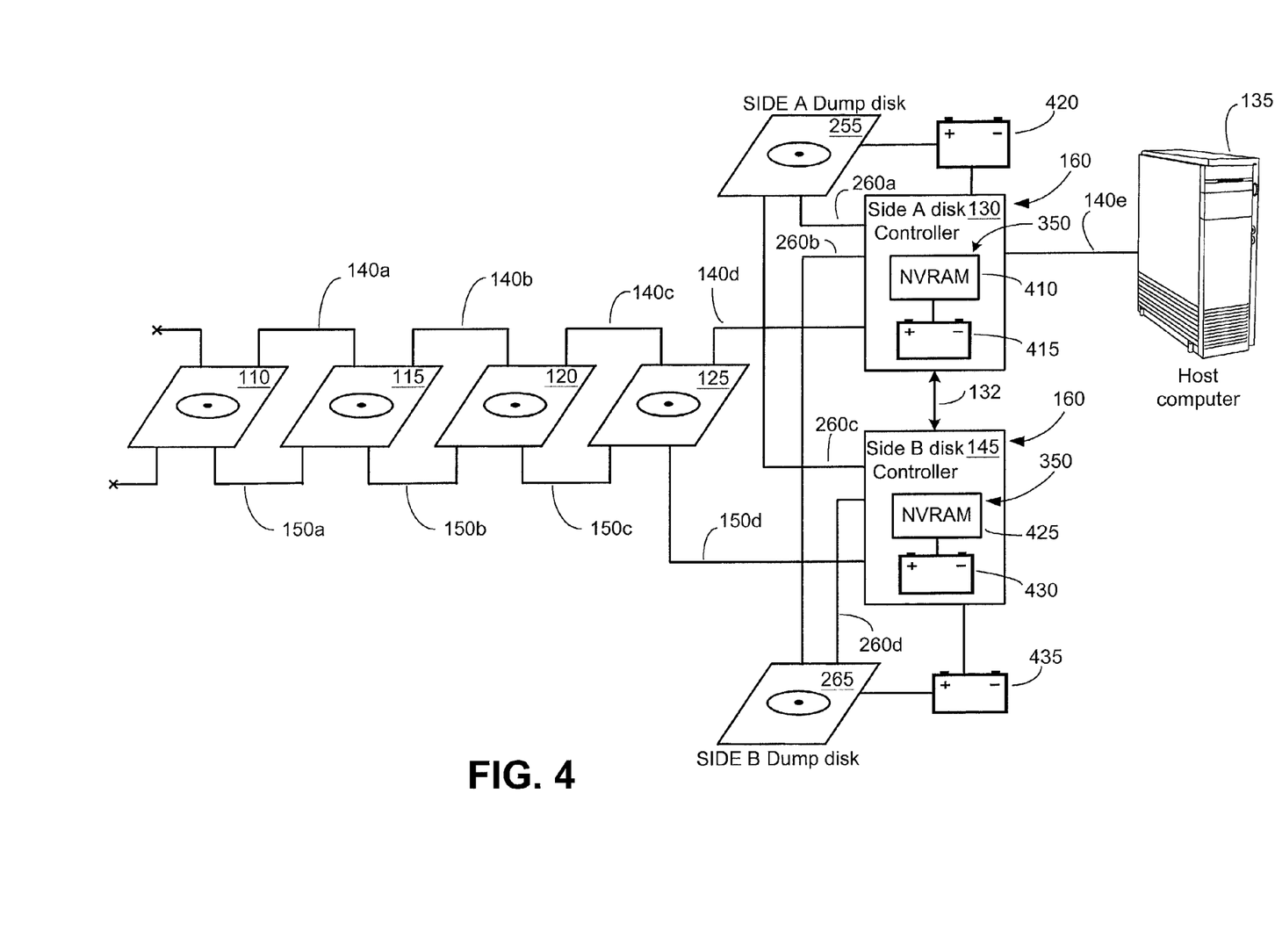
FIG. 4 illustrates NVRAM storage together with battery backed dump disk(s) storage in a redundant disk controller system.

FIG. 4 illustrates an example system that incorporates NVRAM together with battery backed dump disk(s) in a redundant disk controller system. NVRAM 410 is located inside disk controller 130, and due to the provision of an independent power source, such as a battery 415, retains its data contents when main system power fails. The Side A dump disk 255 is also provided with an independent power source, such as a battery 420. Battery 420 is designed with adequate capacity to allow the dump disk 255 to operate during main system power failure at least long enough to permit the contents of the NVRAM 410 to be copied to the dump disk 255. The battery 420 is also typically used to operate other circuitry on the disk controller 130. Such circuitry may be needed to carry out backup operations in the event of a main system power failure.

NVRAM 425 is located inside disk controller 145, and similar to NVRAM 410, is a non-volatile random access memory that retains its data contents when main system power fails. This data retention capability is provided by an independent power source, such as a battery 430, that is connected to NVRAM 425. Side B dump disk 265 is similar to dump disk 255. A power source, such as battery 435, allows the dump disk 265 to operate during main system power failure. Battery 435 is designed with adequate capacity to allow the dump disk 265 to operate during main system power failure at least long enough to permit the contents of the NVRAM 425 to be transferred to the dump disk 265. Similar to the usage of battery 420, the battery 435, or an equivalent power source, may also be typically used to operate other circuitry on the disk controller 145.

Under normal system operating conditions, the data contents of NVRAM 410 and NVRAM 425 are identical, having been "synched" together by the master-slave operational configuration. This action is facilitated by the communication link 132.

The valid data contained in the NVRAM located in the master controller is also copied to both the dump disk 255 and dump disk 265 in a periodical manner. For example, if disk controller 130 is the master controller at any particular instant in time, the valid data contained in NVRAM 410 is copied by master controller 130 into Side A dump disk 255 using link 260*a*, and also into Side B dump disk 265 using link 260*b*.

This data copy operation is generally carried out during normal conditions when the system power has not failed, and the disk controller 130 is not actively involved in servicing commands from host computer 135.

Therefore, in general, when there is a system level power failure, the dump disks 255 and 265 already contain a part of the valid NVRAM data. The only NVRAM data that needs to be transferred into the dump disks at this stage, would consist of data that had not been transferred prior to the power failure. It can be appreciated that this "incremental" valid data may reside in a memory address sector that does not necessarily start at address location 0000. For example, if valid NVRAM data exists from 0000 to FAAA (Hex), and data contents from addresses 0000 through AAAA (Hex) have been already been transferred to the dump disks during normal operating conditions, under a system level power failure condition at this time, only the incremental valid data from AAAB (Hex) to FAAA (Hex) may require transfer into the dump disks. It may be unnecessary to transfer the entire NVRAM data from 0000 to FAAA (Hex) under this power failure condition. Certain systems may utilize this type of "incremental backup" procedure so as to minimize the time needed to backup NVRAM data after a power failure.

Figure 5:
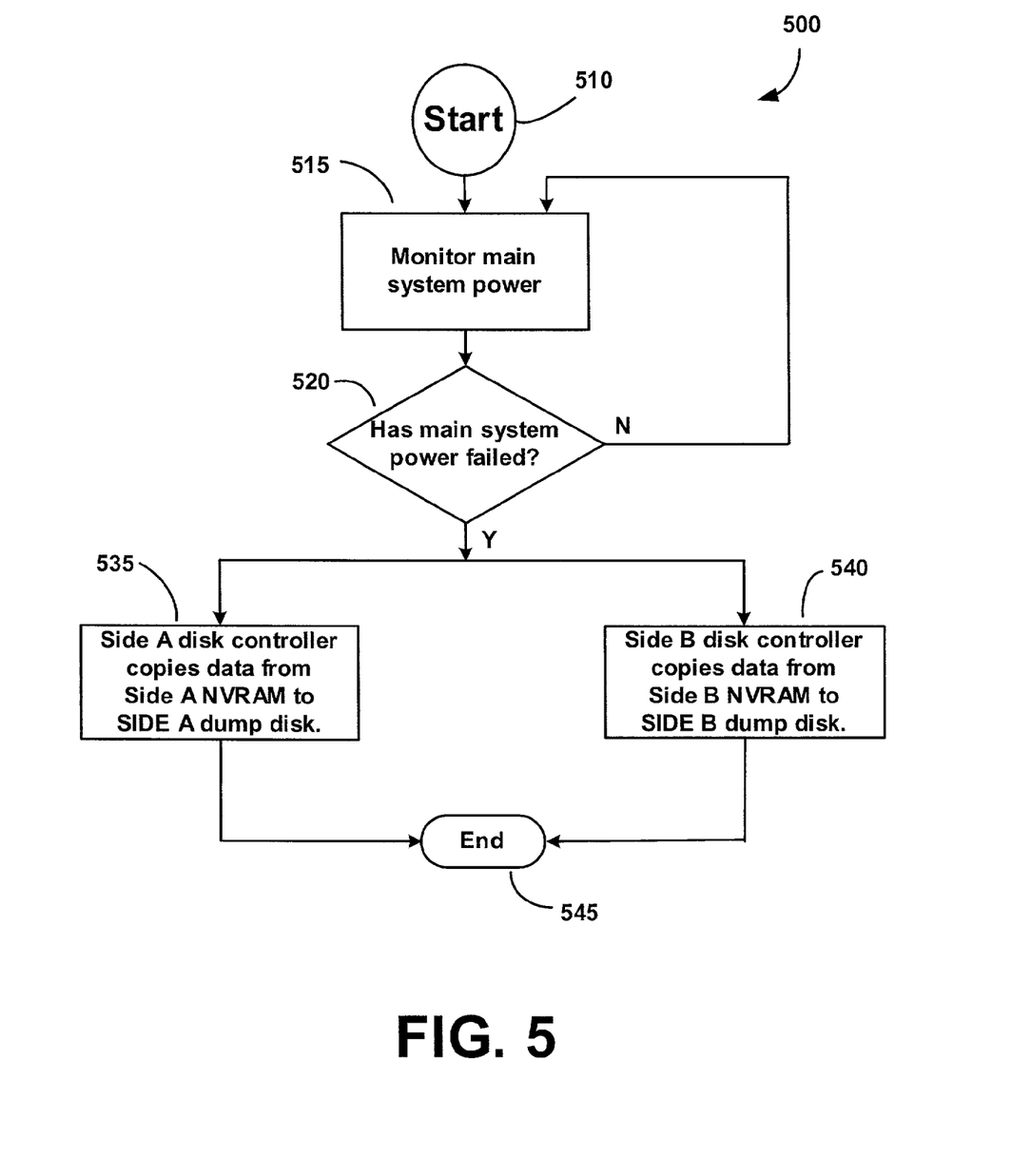
FIG. 5 is a flow-chart that illustrates the steps involved in a representative process of the present invention for copying the contents of NVRAM located on each of the two disk controllers to their corresponding dump disks.

FIG. 5 is a flow-chart that illustrates a representative process for copying the contents of NVRAM located on each of two disk controllers to their corresponding dump disks. It is to be understood that any process steps or blocks shown in FIG. 5 represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved. Code may also be contained in several devices of the invention, and may not be necessarily confined to any particular device. The explanation below, while possibly implying code residency and functionality in certain devices, does so solely for the purposes of explaining the concept behind the invention, and the description should not be construed as a limiting parameter for the invention's various implementations in other applications.

The system determines in steps 515 and 520 if the main system power has failed. If the main system power has failed, as determined by the system in step 520, the process of transferring NVRAM data to dump disk proceeds via steps 535 and 540.

Steps 535 and 540 may be generally implemented to run concurrently, but in certain applications may be allowed to operate with a small time delay between the Side A and the Side B transfers. In step 535, the side A disk controller 130 begins to copy valid data from NVRAM 410 into the side A dump disk 255, and in a fairly simultaneous fashion, in step 540, the side B disk controller 145 begins to copy valid data from its NVRAM 425 into the side B dump disk 265.

As this copy process explained in steps 535 and 540, operates concurrently on both side A and side B of the redundant disk controller system, the time required to backup data into the dump disks is minimized. This is especially significant when compared to a system that may back up data into the dump disks in a non-simultaneous fashion using a sequential or time-multiplexed backup.

Figure 6:
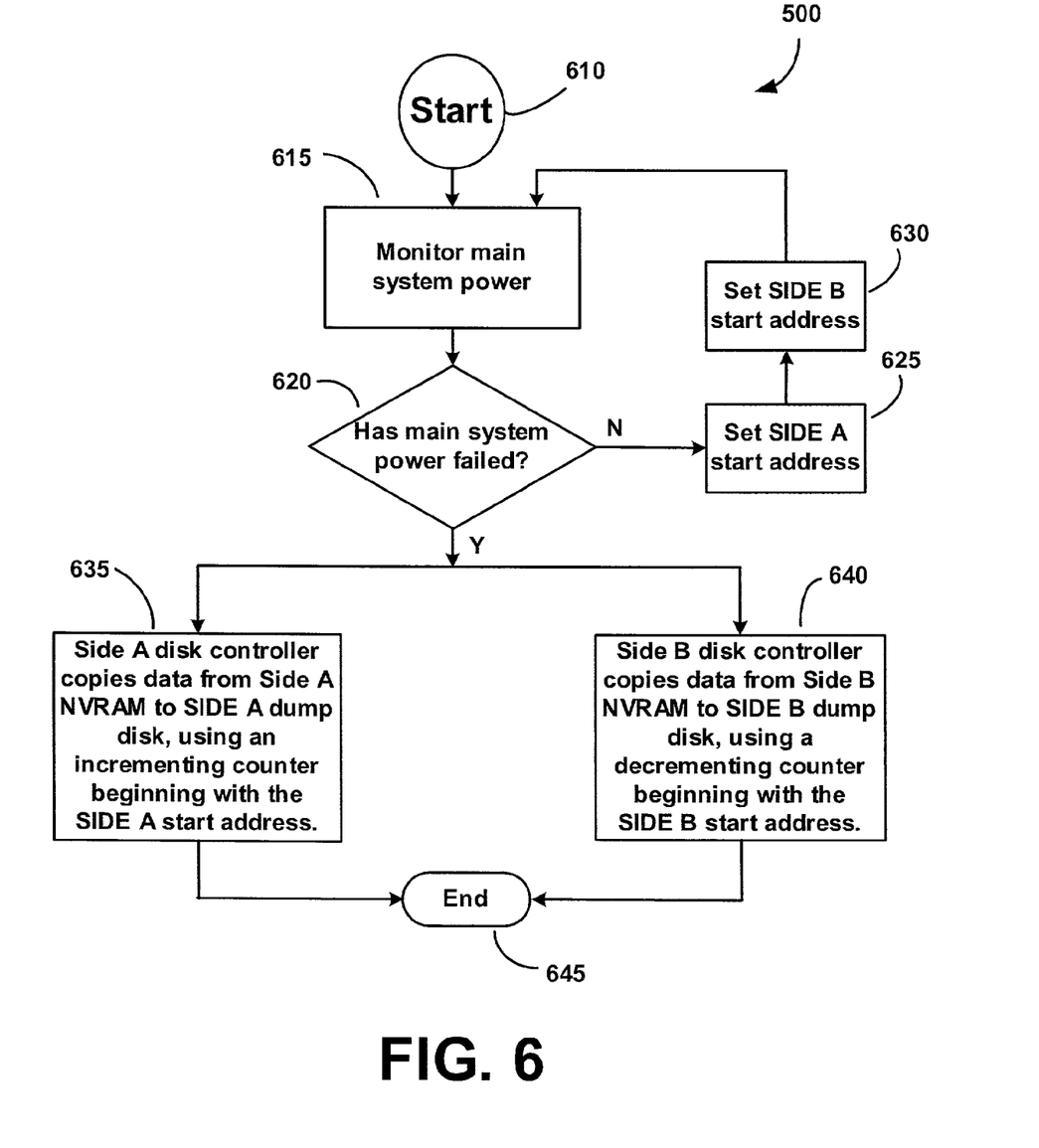
FIG. 6 is a further illustration of FIG. 5 that includes addressing counters.

FIG. 6 is another embodiment of FIG. 5 that includes addressing counters. The system determines in steps 615 and 620 if the main system power has failed. If main system power has not failed, the system sets a start address required for Side A of the redundant disk controller system. This process of setting the start address, which is carried out in step 625, may be a static process whereby the start address is pre-determined and is set accordingly. For example, it may be set at FFFF (Hex).

Alternatively, the process of setting the start address may be a dynamic process, whereby the start address is determined based upon the size of valid data bytes contained in the NVRAM. For purposes of illustration, let us assume that the incremental valid data that has not yet been written into the dump disk, exists from NVRAM address 0FA2 (Hex) to address FFAE (Hex). Under this condition, in the dynamic process for setting the start address, the Side A start address may be set at 0FA2 (Hex) in step 625.

Step 625 of FIG. 5 is followed by Step 630 wherein the system sets a start address for Side B. This is done in a manner compatible to either the static or the dynamic addressing process carried out in step 625. If address FFFF (Hex) were used in a static process in step 625, the system may correspondingly set the Side B start address to 0000 in step 630. If the dynamic process was used in step 625, wherein the Side A start address was set to 0FA2 (Hex), the Side B start address may be correspondingly set to FFAE (Hex) in step 630.

With further reference to FIG. 6, if the main system power has failed, as determined by the system in step 620, the process of transferring NVRAM data to dump disk proceeds via steps 635 and 640. Steps 635 and 640 may be generally implemented to run concurrently, but in certain applications may be allowed to operate with a small time delay between the Side A and the Side B transfers. Using the example cited above for the dynamic process, step 635 of FIG. 6 is referenced to Side A, with a start address of 0FA2 (Hex). In step 635, disk controller 130 (refer FIG. 4) begins to transfer data bytes from NVRAM 410 to Side A dump disk 255, using an incrementing sequence counter that increments from 0FA2 (Hex) towards FFAE (Hex).

In step 640, disk controller 145 (of FIG. 4) begins to transfer data bytes, using the Side B start address of FFAE (Hex) in this example application, from NVRAM 425 to Side B dump disk 265, using a decrementing sequence counter that decrements from FFAE (Hex) towards 0FA2 (Hex).

It can be seen that at some time subsequent to the start of the data transfer process indicated in steps 635 and 640, a crossover point is reached where the data transferred to the two dump disks complement each other and jointly provide a complete image of the NVRAM valid data that had been stored in each NVRAM individually. At this point the NVRAM information has been protected in a joint manner in as little as half the time it would have taken in the conventional method, which may use two counters with an identical incrementing counting scheme in both counters. The novel data backup process outlined in FIG. 6, therefore creates less exposure to NVRAM data loss during a main system power failure. Once the crossover point is reached, each controller can continue copying data onto the hard disks until full redundancy is obtained.

Though the example above utilized two sides, Side A and Side B, it can be appreciated that more than two sides may be implemented in a system that requires such a configuration. In such a case, the start addresses of these multiple sides can be selected in a suitable manner, providing for sufficient address ranges in each of the multiple sides.

While the example above uses an incrementing sequence counter and a decrementing sequence counter, other types of counters using suitable sequence counting schemes may also be used. The purpose behind utilizing count sequences is to accomplish storage of NVRAM data across multiple dump disks in an efficient manner.

An example of a variation in sequence counting schemes can be illustrated using a system wherein the NVRAM has valid data from address 0000 through address FFFF (Hex), and three dump disks, designated Side A, Side B, and Side C, are used.

In this example, Side A may be designated by a start address of 0000, while Side B may start at 5555 (Hex) and Side C may start at AAAA (Hex). If all three counters associated with these three sides are set to increment, Side A will increment from 0000 towards 5555 (Hex), while Side B will increment from 5555 (Hex) towards AAAA (Hex), and Side C increments from AAAA (Hex) towards FFFF (Hex). A complementary copy of the NVRAM valid data will be available across these three dump disks at the moment when Side A counter reaches 5555 (Hex). At this time, Side B counter would read AAAA (Hex), and Side C counter would read FFFF (Hex).

While the software and/or firmware necessary to implement the flowcharts described in FIG. 5 and FIG. 6, may typically reside in the disk controllers, as is shown by the data backup manager 500 in FIG. 3, this software and/or firmware may also be designed to be resident in the host computer 135. The advantage in doing this may lie in overcoming any delays or ambiguities that may occur in the master-slave arbitration process between two or more disk controllers operating amongst themselves to make the determination of who is master.

In most systems, devices which incorporate data backup software are typically designed to operate from a back-up power source in the event of a main system power failure. In certain embodiments, external memory storage sub-systems may be designed with more efficient backup system power available to the host computer 135, than that available to the disk controller 160. In such a situation, the backup software may be placed in the host computer 135, rather than in the disk controller 160. In another embodiment, the disk controller 160 may also contain a sub-set of the data backup software present in the host computer 135.

It should be emphasized that the above-described embodiments of the present invention are merely possible examples of implementations and merely set forth for a clear understanding of the principles of the invention. Many variations and modifications may be made to the above-described embodiment of the invention without departing substantially from the spirit and principles of the invention. For example, it will be appreciated by those skilled in the art that the particular format of the information and medium on which it is communicated could be chosen from any means capable of doing so. All such modifications and variations are intended to be included herein within the scope of the present invention and protected by the following claims.

The invention claimed is:

1. A method for backing up data comprising:
copying a first block of data from a primary storage unit to a primary backup storage unit using a primary addressing sequence that begins with a first start address;
copying a second block of data from a secondary storage unit to a secondary backup storage unit using a secondary addressing sequence that begins with a second start address, wherein the second block of data is a copy of the first block of data and the copying of the first block of data is performed substantially concurrently with the copying of the second block of data;
ending the primary addressing sequence with a first finish address and ending the secondary addressing sequence with a second finish address
setting the second finish address to be the same as the first start address;
setting the primary addressing sequence as an incrementing count; and
setting the secondary addressing sequence as a decrementing count.

2. A method for backing up data comprising:
copying a first block of data from a primary storage unit to a primary backup storage unit using a primary addressing sequence that begins with a first start address;
copying a second block of data from a secondary storage unit to a secondary backup storage unit using a secondary addressing sequence that begins with a second start address, wherein the second block of data is a copy of the first block of data and the copying of the first block of data is performed substantially concurrently with the copying of the second block of data; and
ending the primary addressing sequence with a first finish address and ending the secondary addressing sequence with a second finish address;
wherein
the first finish address is a first intermediate address;
the second start address is a second intermediate address;
the second finish address is a third intermediate address;
the primary addressing sequence comprises an incrementing count; and
the secondary addressing sequence comprises an incrementing count.

3. The method of claim 2, wherein the first intermediate address is the same as the second intermediate address.

4. A system for backing up data comprising:
a primary controller configured to copy a first block of data from a primary storage unit to a primary backup storage unit using a primary addressing sequence that begins with a first start address;
a secondary controller configured to copy a second block of data from a secondary storage unit to a secondary backup storage unit using a secondary addressing sequence that begins with a second start address;
a primary counter configured to generate the primary addressing sequence; and
a secondary counter configured to generate the secondary addressing sequence;
wherein the primary counter is further configured to numerically increment a current primary address, and the secondary counter is further configured to numerically decrement a secondary address.

5. The system of claim 4, further comprising a power failure detection mechanism configured to initiate copying the first block of data and copying the second block of data.

6. The system of claim 5, wherein the detection mechanism is configured to initiate copying the first block of data and substantially concurrently copying the second block of data.

7. The system of claim 5, wherein the primary controller comprises a first non-volatile random access memory, the primary backup storage unit comprises a primary magnetic disk, the secondary controller comprises a second non-volatile random access memory, and the secondary backup storage unit comprises a secondary magnetic disk.

8. The system of claim 7, wherein the primary magnetic disk is a first component of a redundant array of disks, and the secondary magnetic disk is a second component of the redundant array of disks.

9. The system of claim 7, wherein the primary magnetic disk is a component of a primary RAID controller, and the secondary magnetic disk is a component of a secondary RAID controller.

10. A data backup manager stored on a computer-readable medium, the manager comprising:
   logic configured to copy a first block of data from a primary storage unit to a primary backup storage unit using a primary addressing sequence that begins with a first start address;
   logic configured to copy a second block of data from a secondary storage unit to a secondary backup storage unit using a secondary addressing sequence that begins with a second start address;
   logic configured to generate the second block of data as a copy of the first block of data;
   logic configured to copy the first block of data substantially concurrently to copying the second block of data;
   logic configured to end the primary addressing sequence with a first finish address and end the secondary addressing sequence with a second finish address;
   logic configured to set the first finish address to be a first intermediate address;
   logic configured to set the second start address to be a second intermediate address;
   logic configured to set the second finish address to be a third intermediate address;
   logic configured to set the primary addressing sequence as an incrementing count; and
   logic configured to set the secondary addressing sequence as a decrementing count.

11. A system for backing up data comprising:
   means for copying a first block of data from a primary storage unit to a primary backup storage unit using a primary addressing sequence that begins with a first start address;
   means for copying a second block of data from a secondary storage unit to a secondary backup storage unit using a secondary addressing sequence that begins with a second start address;
   means for generating the primary addressing sequence and means for generating the secondary addressing sequence;
   means for generating the primary addressing sequence by numerically incrementing a primary address; and
   means for generating the secondary addressing sequence by numerically decrementing a secondary address.

12. A system for backing up data comprising:
   means for copying a first block of data from a primary storage unit to a primary backup storage unit using a primary addressing sequence that begins with a first start address;
   means for copying a second block of data from a secondary storage unit to a secondary backup storage unit using a secondary addressing sequence that begins with a second start address; and
   means for detecting a power failure before initiation of copying the first block of data, and substantially concurrently initiating the copying of the second block of data.

13. The system of claim 12, further comprising means for generating the primary addressing sequence and means for generating the secondary addressing sequence.

14. A system for backing up data comprising:
   a primary controller configured to copy a first block of data from a primary storage unit to a primary backup storage unit using a primary addressing sequence that begins with a first start address;
   a secondary controller configured to copy a second block of data from a secondary storage unit to a secondary backup storage unit using a secondary addressing sequence that begins with a second start address;
   a host computer configured to control the primary controller and the secondary controller; and
   a primary counter configured to generate the primary addressing sequence, and a secondary counter configured to generate the secondary addressing sequence;
   wherein the primary counter is further configured to numerically increment a current address, and the secondary counter is further configured to numerically decrement a secondary address.

15. A system for backing up data comprising:
   a primary controller configured to copy a first block of data from a primary storage unit to a primary backup storage unit using a primary addressing sequence that begins with a first start address;
   a secondary controller configured to copy a second block of data from a secondary storage unit to a secondary backup storage unit using a secondary addressing sequence that begins with a second start address;
   a host computer configured to control the primary controller and the secondary controller; and
   a power failure detection mechanism that initiates copying the first block of data and copying the second block of data.

16. The system of claim 15, further comprising a primary counter configured to generate the primary addressing sequence, and a secondary counter configured to generate the secondary addressing sequence.

17. The system of claim 15, wherein the detection mechanism initiates copying of the first block of data, and substantially concurrently copying of the second block of data.

18. The system of claim 15, wherein the primary controller comprises a non-volatile random access memory, the primary backup storage unit comprises a primary magnetic disk, the secondary controller comprises a non-volatile random access memory, and the secondary backup storage unit comprises a secondary magnetic disk.

19. The system of claim 18, further comprising a redundant array of disks, wherein the primary magnetic disk is a first component of the redundant array of disks, and the secondary magnetic disk is a second component of the redundant array of disks.

20. The system of claim 18, further comprising primary and secondary RAID controllers, wherein the primary magnetic disk is a component of the primary RAID controller, and the secondary magnetic disk is a component of the secondary RAID controller.

* * * * *